United States Patent

Barito et al.

[11] Patent Number: 5,084,320
[45] Date of Patent: Jan. 28, 1992

[54] EVACUATED THERMAL INSULATION

[76] Inventors: Robert W. Barito; Mary O. Barito, both of 9011 Cardiff Rd., Louisville, Ky. 40242

[21] Appl. No.: 467,922

[22] Filed: Jan. 22, 1990

[51] Int. Cl.$^5$ .............................. B32B 1/06; B32B 5/16
[52] U.S. Cl. ......................................... 428/69; 428/76; 428/68
[58] Field of Search ................................ 428/69, 74, 76

[56] References Cited

U.S. PATENT DOCUMENTS

| 3,179,549 | 4/1965 | Strong et al. | 428/69 |
| 4,159,359 | 6/1979 | Pelloux-Gervais et al. | 428/76 |
| 4,636,415 | 1/1987 | Barito et al. | 428/68 |
| 4,681,788 | 7/1987 | Barito et al. | 428/68 |
| 4,713,275 | 12/1987 | Riccitiello et al. | 428/74 |
| 4,814,300 | 3/1989 | Helferich | 428/316.6 |

Primary Examiner—Alexander S. Thomas

[57] ABSTRACT

Aluminum silicate or mixtures of aluminum silicate and silica are utilized as insulating materials with low thermal conductivities. The aluminum silicate or the mixtures are dried, compressed, placed in a gas-tight envelope, evacuated and sealed. The resultant rigid, board-like panel can be used directly as thermal insulation or it can be used in conjunction with other insulating materials, for example, polyurethane foam.

13 Claims, 3 Drawing Sheets

EVACUATED THERMAL INSULATION

BACKGROUND OF THE INVENTION AND PRIOR ART

The present invention relates to the use of aluminum silicate or mixtures of aluminum silicate and silica to form low thermal conductivity insulation bodies.

Over the years, considerable research and development work has been focused on the design and development of more effective thermal insulation. These efforts resulted in the invention and development of fibrous insulation, for example, fiberglass and mineral wool. Fibrous insulation systems have thermal conductivities that range from 0.230 to 0.350 BTU-IN/HR-SQFT-F. Further work resulted in the development of gas-expanded polymeric materials: foamed polystyrene and polyurethane. These materials had conductivities as low as 0.210 BTU-IN/HR-SQFT-F. The introduction of high molecular weight, chlorofluorocarbon (CFC), gas into polyurethane resins resulted in foams with extremely low thermal conductivity: 0.120 BTU-IN/HR-SQFT-F.

Over 100 years ago it was discovered than an evacuated space provides an effective barrier to the transfer of heat. In fact, it is actually more effective than any modern day insulation. At that time however, and for many years thereafter, its use was confined to the insulation of Dewar flasks, or as they are commonly known, vacuum bottles. This vacuum insulation technology was restricted to this application because only the cylindrical geometry of the flask would prevent collapse of the wall, when the hollow space between the walls was evacuated.

For this unique insulation technology to be applied more widely to other insulation applications, it was necessary to develop evacuated, flat panels. To this end, development work has focused on the filler material to be used in the space between the walls. The selection of this material is critical in making a low conductivity panel since when it is compressed by atmospheric pressure, the filler often becomes very conductive.

In recent years, many investigators have developed and patented evacuated, flat panel insulation. One of the earliest of these patents is U.S. Pat. No. 3,179,549 (Strong et al). It describes an evacuated, flat panel insulation that consists of fiberglass enclosed in a metal container. This type insulation panel was very costly to make and had the added disadvantage of high thermal conductivity caused by heat transfer around the edges of the panel by the metal container. U.S. Pat. No. 4,159,359 (Pelloux-Gervais et al) describes the use of fumed silica as the filler material in an evacuated, flat insulation. The cost of a panel wherein fumed silica is used as the filler material would be prohibitive. Barito et al (U.S. Pat. No. 4,636,415) describes the use of precipitated silica as a filler material in an evacuated, flat panel insulation. Although less costly than fumed silica, precipitated silica is far more costly than aluminum silicate of the present invention. U.S. Pat. No. 4,681,788 (Barito et al) describes the use of mixtures of precipitated silica and fly ash. These compositions are stated to have thermal insulating properties equivalent to evacuated panels made with precipitated silica alone. The major advantage to these mixtures is cost; fly ash, being the residue (ash) of burned coal, is a very inexpensive material. Blending this less costly material with the more costly precipitated silica, reduces the overall cost of the finished panel. The major drawback to the use of fly ash is the inconsistancy of the material. A result of this inconsistancy are variations in the thermal performance of panels made with fly ash. On the other hand, aluminum silicate and silica of the present invention are manufactured products whose properties are stringently controlled.

BRIEF DESCRIPTION OF THE INVENTION

In accordance with the present invention it has been found that a very low conductivity, thermal insulating body can be formed by employing aluminum silicate as a filler material in evacuated insulation systems. Further, in accordance with the present invention it has been found that mixtures of aluminum silicate and silica, when used as fillers in evacuated panels, have lower thermal conductivities than either of the materials when they are used by themselves. This synergistic effect was observed for all mixtures of the two materials.

Mixtures of aluminum silicate and silica in evacuated thermal insulation systems have an economic advantage as well as the synergistic effect cited above. Aluminum silicate is considerably less costly than fumed or precipitated silica. Therefore, when aluminum silicate is used with these silicas in an insulation system it reduces the overall material cost of the finished product.

The aluminum silicate of the present invention is a synonym for sodium aluminum silicate. This material is also known as sodium aluminosilicate: a precipitated silicate. Aluminum silicate is precipitated from solution when sodium silicate solution is mixed with aluminum sulfate. The resultant product is filtered, dried and milled. Typical fields of application for this powdery material are: an extender for titanium dioxide and lithopone in emulsion paints and as a filler in printing ink.

The production of precipitated silica is similar to the process described for the manufacture of aluminum silicate. Silica is precipitated from solution when a mineral acid and an alkaline silicate solution are simultaneously added to water or a salt solution. The resultant silica is filtered, dried and milled. Precipitated silica is used in numerous applications: anti-caking agent, abrasive agent in toothpaste and a dispersant for powders.

Fumed silica is obtained from the hydrolysis of silicon tetrachloride in an oxygen-hydrogen flame. Fumed silica was developed as a rubber reinforcing pigment, or "white carbon black".

Thermal insulation panels were fabricated using aluminum silicate or mixtures of aluminum silicate and silica, a microporous pouch, and a plastic envelope. In the experiments that were performed, dry powder materials were charged to a microporous pouch and the pouch was sealed. The powder was then pressed inside the microporous pouch to yield a rigid, board-like product. The board-like product was inserted into the open end of the plastic envelope. The entire panel was then evacuated to a pressure of less than 2 millibars and sealed.

The finished panel can be placed in the space to be insulated or, alternatively, the panel can be encapsulated in foam and then placed in the insulation space. Further, the panels can be affixed to a wall in the insulation space and foamed-in-place with polyurethane or other foamable polymers. Thermal devices that would readily lend themselves to foam-in-place applications are: refrigerators, freezers and portable coolers.

DESCRIPTION OF THE PREFERRED EMBODIMENTS

Figure 1:
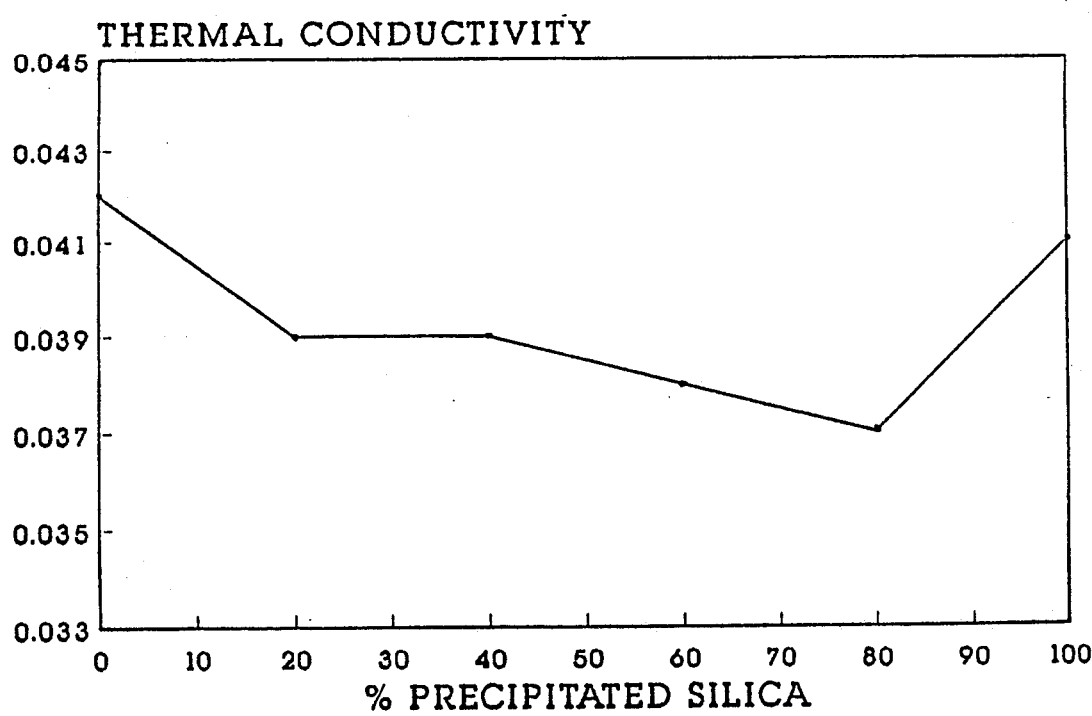
FIG. 1 is a graph of thermal conductivity (K factor) versus the percent of Sipernat 22 LS (precipitated silica) admixed with Aluminum Silicate P 820.

The insulating systems of the present invention consist of either aluminum silicate or mixtures of aluminum silicate and silica, compacted and evacuated inside a plastic envelope.

The following general procedure was used in making the insulation panels of the present invention:

a. dry powder was charged to a microporous pouch and the pouch was sealed.

b. The powder in the pouch was compressed to yield a rigid, board-like panel.

c. The rigid, board-like panel was placed inside a plastic envelope, which when sealed has excellent resistance to gas permeation.

d. With one end of the plastic envelope open, the entire panel was placed in an evacuation chamber, evacuated to a pressure of 2 millibars and sealed.

The following are examples of the practice of the present invention.

EXAMPLE 1

Thermal insulation panels were fabricated from Aluminum Silicate sold by Degussa Corporation under the designation Aluminum Silicate P 820. The P 820 had a BET surface area of 100 square meters per gram, an average primary particle size of 15 nanometers, and a tapped density of 170 grams per liter.

A sufficient quantity of dry P 820 powder was charged to a microporous pouch to yield a finished panel approximately 9.5 inches × 9.5 inches × 0.5 inches. The microporous material used to make the pouch was a spunbonded olefin sold by DuPont under the name Tyvek. After the P 820 was placed in the pouch, the fourth side of the pouch was heat sealed. The pouch containing the powder was pressed to the desired density and thickness. Pressing and compacting the powder made a rigid board-like panel. The board-like panel was then placed in a plastic envelope which when sealed has excellent resistance to gas permeation. With one end of the plastic envelope open, the panel was placed in the evacuation chamber, evacuated to a pressure of 2 millibars and then the fourth side of the panel was sealed.

The plastic used in the gas barrier envelope was a composite film sold by Fres-co Systems USA, Inc. under the designation VECAT.

EXAMPLE 2

Thermal insulation panels were made from mixtures of Aluminum Silicate P 820 and precipitated silica. The aluminum silicate is the same material used in Example 1. The precipitated silica that was used is produced by North America Silica Company and is designated Sipernat 22 LS. The Sipernat 22 LS had a BET surface area of 170 square meters per gram, an average agglomerate size of 4.5 micrometers, and a tapped density of 80 grams per liter.

The two materials (Aluminum Silicate P 820 and Sipernat 22 LS) were thoroughly mixed in the following proportion:

80 parts by volume Aluminum Silicate P 820
20 parts by volume Sipernat 22 LS

The mixture was dried and panels were produced by the same process described in example 1. The materials used in example 1 for the microporous pouch and the gas barrier envelope were used in this example.

EXAMPLE 3

The two materials (Aluminum Silicate P 820 and Sipernat 22 LS) used to make panels in example 2 were used in this example. The two were thoroughly mixed in the following proportion:

60 parts by volume Aluminum Silicate P 820
40 parts by volume Sipernat 22 LS

The mixture was dried and panels were produced by the same process described in example 1. The material used in example 1 for the microporous pouch and the gas barrier envelope were used in this example.

EXAMPLE 4

The two materials (Aluminum Silicate P 820 and Sipernat 22 LS) used to make panels in Example 2 were used in this example. The two materials were thoroughly mixed in the following proportion:

40 parts by volume Aluminum Silicate P 820
60 parts by volume Sipernat 22 LS

The mixture was dried and panels were produced by the same process described in example 1. The materials used in example 1 for the microporous pouch and the gas barrier envelope were used in this example.

EXAMPLE 5

The two materials (Aluminum Silicate P 820 and Sipernat 22 LS) used to make panels in example 2 were used in this example. The two materials were thoroughly mixed in the following proportion:

20 parts by volume Aluminum Silicate P 820
80 parts by volume Sipernat 22 LS

The mixture was dried and panels were produced by the same process described in example 1. The materials used in example 1 for the microporous pouch and the gas barrier envelope were used in this example.

EXAMPLE 6

In this example thermal insulation panels were made from Sipernat 22 LS. The material was dried and panels were produced by the same process described in example 1. The materials used in example 1 for the microporous pouch and the gas barrier envelope were used in this example.

Table 1 sets forth the data obtained on panels with the compositions used in example 1 through example 6 and produced according to the process described in example 1. FIG. 1 is a graph, produced from the data in Table 1, which shows thermal conductivity (K factor) as a function of panel compositions.

TABLE 1

| EXAMPLE | COMPOSITION VOL. RATIO P 820/22 LS | DENSITY (PCF) | INTERNAL PANEL PRESSURE (TORR) | K FACTOR (BTU-IN/ HR-SQFT-F) |
| --- | --- | --- | --- | --- |
| #1 | 100/0 | 18.0 | 2.5 | 0.042 |
| #2 | 80/20 | 16.7 | 1.8 | 0.039 |
| #3 | 60/40 | 15.4 | 1.1 | 0.039 |
| #4 | 40/60 | 14.1 | 0.8 | 0.038 |
| #5 | 20/80 | 12.8 | 1.9 | 0.037 |
| #6 | 0/100 | 11.5 | 1.3 | 0.041 |

EXAMPLE 7

Thermal insulation panels were made from mixtures of Aluminum Silicate P 820 and FK 500 LS precipitated silica. This precipitated silica was manufactured by North America Silica Company. The FK 500 LS has a BET surface area of 450 square meters per gram, an average agglomerate size of 4.5 micrometers and a tapped density of 80 grams per liter. The two materials (P 820 and FK 500 LS) were thoroughly mixed in the following proportion:
80 parts by volume Aluminum Silicate P 820
20 parts by volume FK 500 LS
The mixture was dried and panels were produced by the same process described in example 1. The material used in example 1 for the microporous pouch and the gas barrier envelope were used in this example

EXAMPLE 8

The two materials (Aluminum Silicate P 820 and FK 500 LS) used to make panels in example 7 were used in this example. The two materials were thoroughly mixed in the following proportions:
50 parts by volume Aluminum Silicate P 820
50 parts by volume FK 500 LS
The mixture was dried and panels were produced by the same process described in example 1. The material used in example 1 for the microporous pouch and the gas barrier envelope were used in this example.

EXAMPLE 9

The two materials (Aluminum Silicate P 820 and FK 500 LS) used to make panels in Example 7 were used in this example. The two materials were thoroughly mixed in the following proportion:
20 parts by volume Aluminum Silicate P 820
80 parts by volume FK 500 LS
The mixture was dried and panels were produced by the same process described in example 1. The materials used in example 1 for the microporous pouch and the gas barrier envelope were used in this example.

EXAMPLE 10

In this example thermal insulation panels were made from FK 500 LS precipitated silica. The silica was dried and panels were produced by the same process described in example 1. The material used in example 1 for the microporous pouch and the gas barrier envelope were used in this example.

Figure 2:
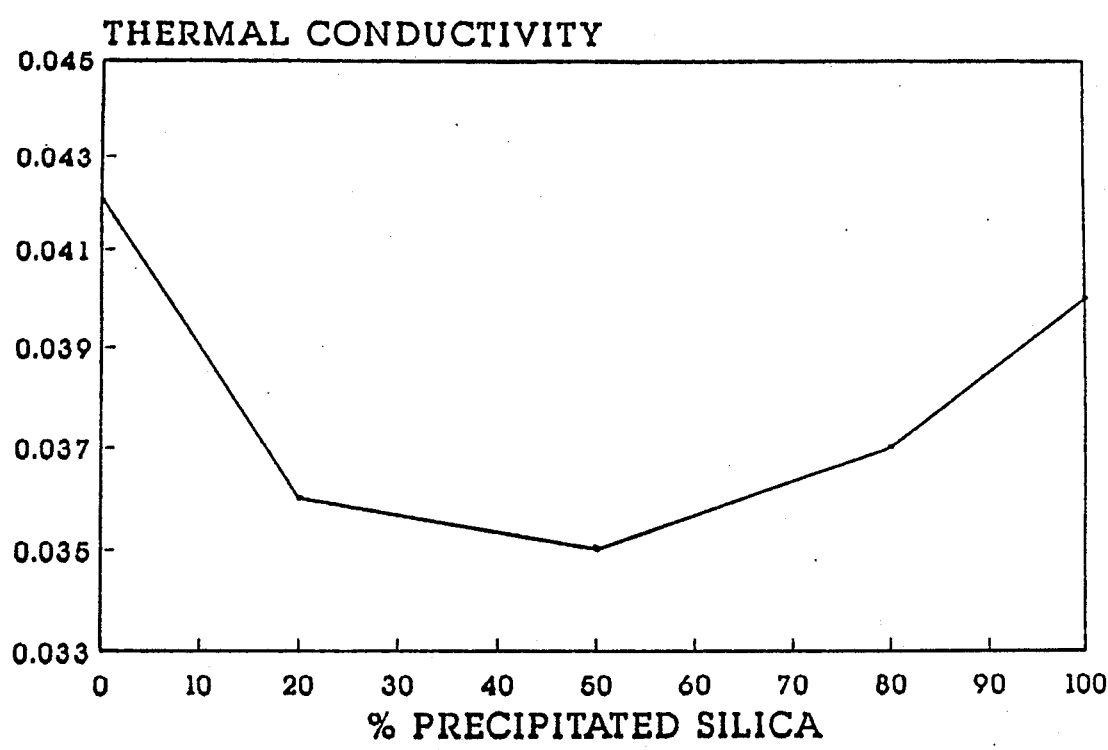
FIG. 2 is a graph of thermal conductivity (K factor) versus the percent of FK 500 LS (precipitated silica) admixed with Aluminum Silicate P 820.

Table 2 sets forth the data obtained on panels with the compositions used in example 1 and examples 7 through 10. These panels were produced according to the process described in example 1. FIG. 2 is a graph, produced from the data in Table 2, which shows thermal conductivity (K factor) as a function of panel compositions.

TABLE 2

| EXAMPLE | COMPOSITION VOL. RATIO P 820/FK500LS | DENSITY (PCF) | INTERNAL PANEL PRESSURE (TORR) | K FACTOR (BTU-IN/ HR-SQFT-F) |
| --- | --- | --- | --- | --- |
| #1 | 100/0 | 18.0 | 2.5 | 0.042 |
| #7 | 80/20 | 16.9 | 1.5 | 0.036 |
| #8 | 50/50 | 15.8 | 2.0 | 0.035 |
| #9 | 20/80 | 13.6 | 1.8 | 0.037 |
| #10 | 0/100 | 12.5 | 1.7 | 0.040 |

EXAMPLE 11

Thermal insulation panels were made from mixtures of Aluminum Silicate P 820 and Aerosil 380 fumed silica. The Aerosil 380 fumed silica used was produced by Degussa Corporation. Aerosil 380 has the the following distinguishing characteristics: a BET surface area of 380 square meters per gram, an average primary particle size of 7 nanometers and a tapped density of 50 grams per liter. The two materials (P 820 and Aerosil 380) were thoroughly mixed in the following proportion:
80 parts by volume Aluminum Silicate P 820
20 parts by volume Aerosil 380
The mixture was dried and panels were produced by the same process described in example 1. The material used in example 1 for the microporous pouch and the gas barrier envelope were used in this example.

EXAMPLE 12

The two materials (Aluminum Silicate P 820 and Aerosil 380) were used to make panels in example 11 were used in this example. The two materials were thoroughly mixed in the following proportion:
20 parts by volume Aluminum Silicate P 820
80 parts by volume Aerosil 380
The mixture was dried and panels were produced by the same process described in example 1. The materials used in example 1 for the microporous pouch and the gas barrier envelope were used in this example.

EXAMPLE 13

In this example thermal insulation panels were made from Aerosil 380 fumed silica. The silica was dried and panels were produced by the same process described in example 1. The materials used in example 1 for the microporous pouch and the gas barrier envelope were used in this example.

Figure 3:
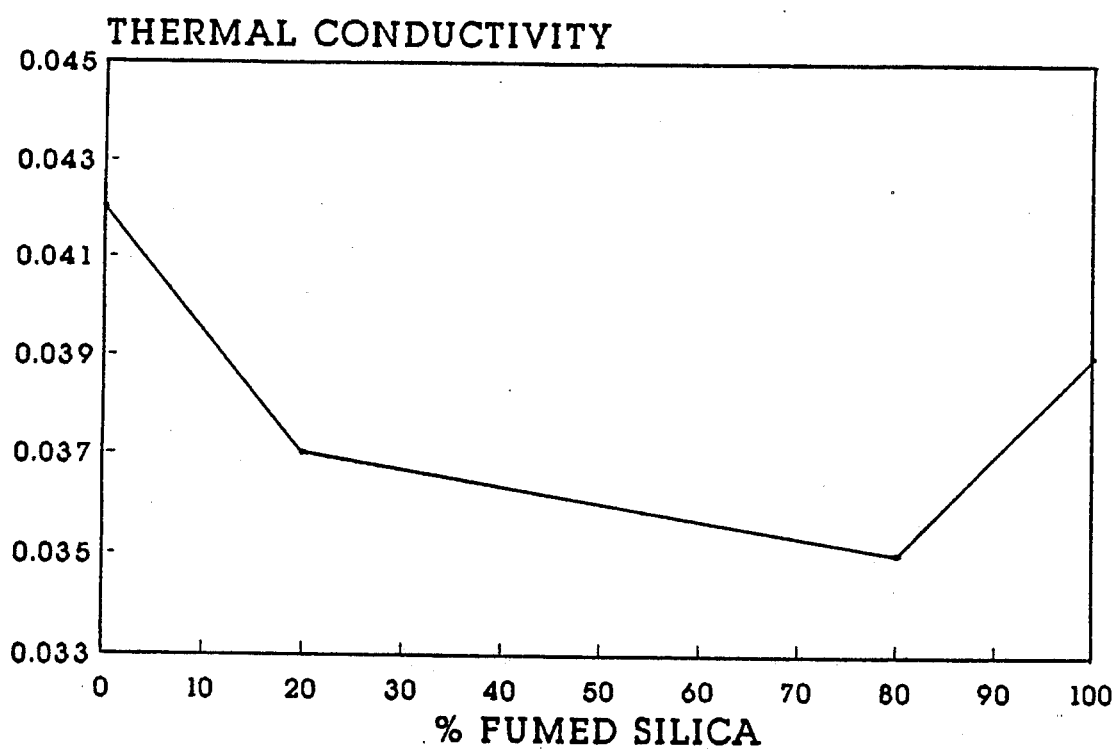
FIG. 3 is a graph of thermal conductivity (K factor) versus the percent of Aerosil 380 (fumed silica) admixed with Aluminum Silicate P 820.

Table 3 sets forth the data obtained on panels with the compositions used in example 1 and examples 11 through 13. These panels were produced according to the process described in example 1. FIG. 3 is a graph, produced from the data in Table 3, which shows thermal conductivity (K factor) as a function of panel compositions.

TABLE 3

| EXAMPLE | COMPOSITION VOL. RATIO P 820/AEROSIL 380 | DENSITY (PCF) | INTERNAL PANEL PRESSURE (TORR) | K FACTOR (BTU-IN/ HR-SQFT-F) |
|---------|------------------------------------------|---------------|--------------------------------|------------------------------|
| #1      | 100/0                                    | 18.0          | 2.5                            | 0.042                        |
| #11     | 80/20                                    | 16.7          | 1.6                            | 0.037                        |
| #12     | 20/80                                    | 13.2          | 2.0                            | 0.035                        |
| #13     | 0/100                                    | 12.0          | 1.5                            | 0.039                        |

The examples demonstrate that evacuated insulation panels, based on aluminum silcate or mixtures of aluminum silicate and silica, can be made that have very low thermal conductivities. Further, they demonstrate the synergistic effect on thermal conductivity when the two materials are blended together.

EXAMPLE 14

Thermal conductivity measurements were also made on one of the panels from example 1 (aluminum silicate) and one of the panels from example 2 (80/20 aluminum silicate-silica) after the panels were punctured. When the internal pressure in the panels attained atmospheric pressure the following thermal conductivities (K factors) were measured:
example 1—0.173 BTU-IN/HR-SQFT-F
example 2—0.165 BTU-IN/HR-SQFT-F
These example demonstrate that aluminum silicate or mixtures of aluminum silicate and silica at atmospheric pressure are good insulators.

When evacuated panels were used in conjunction with a foam, the overall conductivity was found to be a function of the thickness and conductivity of each component, viz., the evacuated panel and foam. As an example, when chlorofluorocarbon (CFC) blown polyurethane (K factor=0.12 and thickness=1.5 inches) encapsulates an evacuated panel (K factor=0.04 and thickness=0.5 inches) of the present invention, the resultant K factor is 0.080 BTU-IN/HR-SQFT-F. When a carbon dioxide (non-CFC) blown polyurethane (K factor=0.16) and thickness=1.5 inches) encapsulates an evacuated panel (K factor=0.04 and thickness=0.5 inches) of the present invention, the resultant K factor is 0.091 BTU-IN/HR-SQFT-F.

In accordance with the present invention, the use of aluminum silicate or mixtures of aluminum silicate with silica (both precipitated and fumed) have been shown to produce thermal insulation systems with very low thermal conductivities. A specific aluminum silicate and specific precipitated and fumed silicas were used as examples of the present invention. The invention should not be limited to the specific silicate or silicas used in the examples, but rather by the appended claims.

We claim:

1. A thermal insulation article comprising a composition of dried aluminum silicate and silica powder compressed into a predetermined form and sealed within an evacuated gas-tight envelope, said aluminum silicate and silica being present in amounts sufficient to cause the K factor of the article to be less than the K factor of an article when either powder in compressed form are present alone.

2. The article of claim 1 where the volume percent of aluminum silicate in the article is at least 20%.

3. The article of claim 1 in which the aluminum silicate in uncompressed form had a BET surface area of about 100 square meters per gram, an average primary particle size of about 15 nanometers, and a tapped density of about 170 grams per liter.

4. The article of claim 1 in which the silica was selected from a group consisting of precipitated silica or fumed silica.

5. The article of claim 1 in which the aluminum silicate in uncompressed form had a BET surface area of about 100 square meters per gram and the silica in uncompressed form had a BET surface area of between about 170 square meters per gram and about 450 square meters per gram.

6. The article of claim 1 in which the gaseous pressure within said envelope is less than about 20 torr.

7. The article of claim 1 in which the composition is compressed to a density of between about 10 and 20 pounds per cubic foot.

8. The article of claim 7 including a foamed insulation material encapsulating said predetermined form.

9. The article of claim 8 in which the internal pressure within said envelope is no more than about 20 torr.

10. The article of claim 8 in which the silica is selected from a group consisting of precipitated silica or fumed silica.

11. A thermal insulation material comprising dried particulate aluminum silicate and silica compressed into a composition having a density of between about 10 and 20 pounds per cubic foot, bounded by a microporous pouch, and sealed within a gas-tight envelope evacuated to no more than about 20 torr.

12. The material of claim 11 wherein the silica is selected from a group consisting of precipitated silica or fumed silica.

13. The material of claim 12 wherein the gas-tight envelope is encapsulated in a foamed insulation material.

* * * * *